United States Patent [19]

Roeder

[11] 4,349,916
[45] Sep. 14, 1982

[54] ADAPTIVE INTERFERENCE TRACKER FOR SUPPRESSION OF NARROW BAND INTERFERENCE

[75] Inventor: Allan W. Roeder, Whitesboro, N.Y.

[73] Assignee: The United States of America as represented by the Secretary of the Air Force, Washington, D.C.

[21] Appl. No.: 175,795

[22] Filed: Aug. 6, 1980

[51] Int. Cl.³ .............................................. H04B 1/10
[52] U.S. Cl. .................................. 375/103; 375/51; 328/166; 328/167; 370/6
[58] Field of Search .................. 375/11, 15, 57, 58, 375/76, 99, 34, 101, 102, 103; 370/6; 371/41, 64; 455/50, 63, 295, 296, 303–306; 358/36, 155; 364/574; 328/162, 165, 166; 333/18

[56] References Cited

U.S. PATENT DOCUMENTS

| | | | |
|---|---|---|---|
| 4,004,226 | 1/1977 | Qvreshi | 375/15 |
| 4,032,847 | 6/1977 | Unkauf | 375/102 |
| 4,237,554 | 12/1980 | Gitlin et al. | 333/18 |
| 4,247,940 | 1/1981 | Mueller | 375/15 |
| 4,253,184 | 2/1981 | Gitlin et al. | 333/18 |

OTHER PUBLICATIONS

Adaptive Noise Cancelling: Principles and Applications by Widrow et al., Proceedings of IEEE, vol. 63, No. 12, Dec. 1975.

Primary Examiner—Benedict V. Safourek
Assistant Examiner—Stephen Chin
Attorney, Agent, or Firm—Donald J. Singer; Willard R. Matthews

[57] ABSTRACT

Adaptive filtering of narrow band interference is achieved by means of a circuit that automatically estimates the amplitude and frequency of narrow band interference in the presence of a wide band signal. The estimate of the interference is subtracted from the input signal. Sample data baseband signals are processed in order to estimate the frequency and amplitude of interfering signals. The filter employs two tracking loops which act together to provide a second order tracking function. The first tracking loop provides a smoothed estimate of the interference. The second tracking loop provides a signal that adjusts a phase shifter to track the interfering signal frequency. Subtraction of the estimated interference from the input signal provides an output signal with attenuated interference and that is only slightly distorted.

5 Claims, 2 Drawing Figures

ADAPTIVE INTERFERENCE TRACKER FOR SUPPRESSION OF NARROW BAND INTERFERENCE

STATEMENT OF GOVERNMENT INTEREST

The invention described herein may be manufactured and used by or for the Government for governmental purposes without the payment of any royalty thereon.

BACKGROUND OF THE INVENTION

This invention falls within the field of art of baseband data processing of radio-frequency signals and, in particular, relates to the adaptive filtering of narrow band interference, either intentional or unintentional. It is applicable to spread spectrum communicators, radar, navigation and identification equipments.

In the past, narrow band interference filtering has been accomplished by using RF tunable notched filters. Such filters are usually large and expensive to produce and are not generally suitable for high volume production. Also, it is difficult to build narrow band RF filters since the size of the filter is inversely related to bandwidth. This means that very narrow band RF tunable notched filters require very large components. These disadvantages are overcome by utilizing the baseband data processing and adaptive filter approach of the present invention. It is a general advantage that baseband circuits can be built using solid state monolithic circuits which result in lower cost and smaller size for high volume production. There are also functional advantages in that the bandwidth and center frequency of such filters can be easily adjusted and the bandwidths can be made arbitrarily narrow.

SUMMARY OF THE INVENTION

The technique of the invention is to process sample data baseband signals in order to estimate the frequency and amplitude of narrow band interference in radio frequency signals. The estimated interference is subtracted from the input signal to provide an output signal that is only slightly distorted and in which the interference is substantially attenuated.

The invention is implemented by means of an interference filter which comprises: a synchronous detector for deriving in-phase and quadrature baseband signals from the RF input signal; a sample and hole circuit for sampling the output of the synchronous detector to provide sample data baseband signals; an interference estimating circuit that generates estimated in-phase and quadrature interference signals; and, means for subtracting the estimated in-phase and quadrature interference signals from the sample data baseband signals to provide an input to the interference estimating circuit and to provide an interference free output signal. Adaptive operation is accomplished by means of two tracking loops, the first returning the output of the interference estimating circuit to its input to provide a smoothed estimate of the interference and the second controlling the phase of a phase shifting integrator to track the interfering signal frequency.

It is a principal object of the invention to provide a new and improved adaptive interference tracker for the suppression of narrow band interference in broadband RF signals.

It is another object of the invention to provide means for adaptively filtering narrow band interference from radio frequency signals wherein the center frequency can be easily adjusted and the bandwidth made arbitrarily narrow.

It is another object of the invention to provide an adaptive filter for filtering narrow band interference from broadband RF signals that can be fabricated using solid state monolithic circuits.

It is another object of the invention to provide an adaptive filter for filtering narrow band interference from broadband RF signals that is readily adaptable to high volume production.

It is another object of the invention to provide an adaptive filter for filtering narrow band interference from broadband RF signals that is smaller and less expensive than commonly used RF tunable notched filters.

These together with other objects features and advantages of the invention will become more readily apparent from the following detailed description when taken in conjunction with the illustrative embodiment of the accompanying drawings.

DETAILED DESCRIPTION OF THE PREFERRED EMBODIMENT

Figure 1:
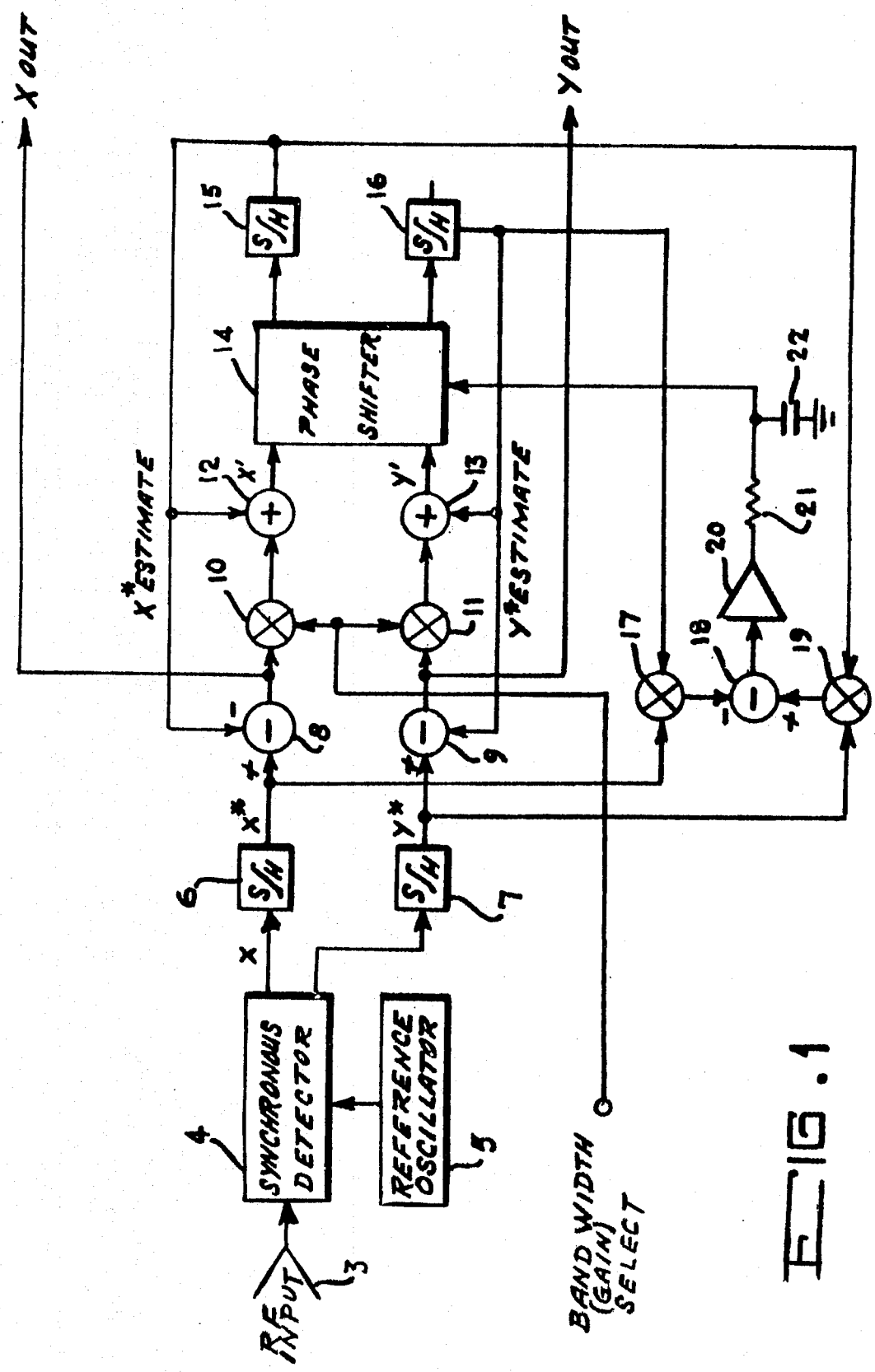
FIG. 1 is a functional block diagram of the interference filter of the invention.

A functional block diagram for the adaptive interference filter of the invention is shown in FIG. 1. It comprises input 3, synchronous detector 4, reference oscillator 5, sample and hold circuits 6, 7, subtractors 8, 9, multipliers 10, 11, summing means 12, 13, phase shifter 14, sample and hold circuits 15, 16, multipliers 17, 19, subtractor 18, amplifier 20, resistor 21 and capacitor 22 connected in the circuit arrangement shown. Synchronous detector 4 is a standard component such as is commonly used in coherent receivers. There are many possible implementations of this device including the use of two balanced modulators—demodulator LSI circuits such as Motorola MC 1496 and a 90 degree phase shifter. The multipliers, summing and differencial means and sample and hold circuits are also standard catalogue items. For example, the multipliers can be Motorola MC 1595 four quandrant multipliers, adders or subtractors can be Motorola MC 1741 general purpose operational amplifiers, and sample and hold circuits can be Analog Devices SHA-1A sample and hold amplifiers.

In operation, the RF input signal is synchronously detected to obtain "X" and "Y" baseband signals. The X and Y baseband signals are the in-phase and quadrature outputs of synchronous detector 4. The equations below describe the RF input signal, the interference signal, the reference signal to the synchronous detector, and the X, Y outputs.

The input RF signal is:

$$S = A(t) \cos[W_o t + \phi(t)] \qquad (1)$$

where
$A(t)$ = amplitude of the input signals
$W_o$ = center frequency of the input signal
$\phi(t)$ = phase of the input signal
The interference signal is $$J = B(t) \cos[W_j t + \phi_j(t)] \qquad (2)$$

where
B(t) = amplitude of the interference
$W_j$ = center frequency of the interference
$\phi_j(t)$ = phase of the interference
The reference signal for a coherent phase locked receiver is:

(a) $R_X = \cos[W_o t]$ (3)

(b) $R_Y = \sin[W_o t]$ (3)

The synchronous detector provides an output which is the product of the inputs passed through a low pass filter.

$$X = f((S + J), R_X) \quad (4)$$

$$Y = f((S + J), R_Y)$$

where $$X = A(t) \cos \phi(t) + B(t) \cos[(W_o - W_j)t - \phi_j(t)] \quad (5)$$

$$Y = A(t) \sin \phi(t) + B(t) \sin[(W_o - W_j)t - \phi_j(t)]$$

The interference filter of the invention works on the second right hand terms of equation (5).

The baseband signals are then sampled at the signal data rate (broadband input signal) by sample and hold circuits 6, 7. The sampling signal can be derived from the system clock which provides timing and synchronization in radar and navigation system. Estimates of the input signals X* EST and Y* EST are subtracted from the sampled signals by subtractor 8, 9 to obtain the outputs X out and Y out.

The output signals are multiplied by a scaling constant by multipliers 10, 11 and then added by summing means 12, 13 to the estimated signals. The scaling constant determines the bandwidth of the filters. The scaling constant can be provided by either a fixed resistor divider network or by a potentimeter divider for adjustable scaling factor.

The *summed* outputs, ($x^1$ and $y^1$), of the adders 12, 13 are then sent to phase shifter 14 which shifts the phase of the signals. The equations describing the function of the phase shifter are:

$$X^*EST = X^1 \cos \phi - Y^1 \sin \phi \quad (6)$$

$$Y^*EST = X^1 \sin \phi + Y^1 \cos \phi \quad (7)$$

$$-\tan \phi/2 = K \quad (8)$$

The frequency control signal (K), determines the magnitude and direction of the phase shift. The control signal (K) is developed from the cross-product of the sampled input and sample estimates. The equations describing the function is:

$$K_i = K_{i-1} + S_F(X^*Y_{EST} - Y^*X_{EST}). \quad (9)$$

Where $S_F$ = scaling factor which controls the bandwidth of the tracking loop.

The adaptive feature of the filter is provided by two tracking loops which act together to provide a second-order tracking function. The first tracking loop provides a signal estimate feedback signal ($X^*_{EST}$ and $Y^*_{EST}$) which is a smoothed estimate of the interference. In the absence of coherent interference $X^*_{EST}$ and $Y^*_{EST}$ go to nearly zero (smoothed noise levels). The estimates $X^*_{EST}$ and $Y^*_{EST}$ are subtracted from the input signal X*, Y* in subtractions by subtractors 8, 9 of FIG. 1. The subtracted outputs, $X_{out}$, $Y_{out}$ are the output signals which are sent to a spread spectrum receiver. The error signal, or output signal, is multiplied by a scaling constant in multipliers 10 and 11. The scaled error signals are then integrated in the phase shifting integrator consisting of summing means 12, 13, phase shifter 14, and sample and hold circuits 15, 16. If the input to the phase shifter from the filter amplifier comprised of amplifier 20, resistor 21 and capacitor 22 is zero, the phase shift is zero and the phase shifting integrator provides an $X^*_{EST}$, $Y^*_{EST}$, which is the integrated error signal.

For example, if a coherent interfering signal is at the same frequency as the reference oscillator 5, then DC signals will appear at the outputs of sample and hold circuits 6, 7. If the phase shifter input from amplifier 20 is zero, the recursive filter provided by the subtractors 8, 9, multipliers 10, 11, and the phase shifting integrator will provide an $X^*_{EST}$, $Y_{EST}$ which is exactly equal to X*, Y*. Any constant difference between the estimate and input will be integrated by the recursive filter until the difference is zero.

Signals and non-coherent interference will provide a random error signal at the outputs of subtractors 8 and 9 and the $X^*_{EST}$, $Y^*_{EST}$ will be low level random signals because of the small scaling factor introduced in multipliers 10 and 11.

For another example: If the coherent interfering signal differs from the reference oscillator frequency by a constant offset, and the offset causes a phase rotation of $\theta$ degrees each sample, then the outputs of sample and hold circuits 6 and 7 are sampled sine waves.

$$X^* = B \cos[\theta n + \phi]$$

$$Y^* = B \sin[\theta n + \phi]$$

Where:
X* and Y* are the sampled sine waves
$\theta$ is the phase rotation each sample
n is the sample time index
$\phi$ is an arbitrary phase angle.

For this case, if the output of filter amplifier 20 provides a signal which causes the estimated $X^*_{EST}$, $Y^*_{EST}$ signals to be phase shifted $\theta$ degrees each sample, then the estimates are rotating at the same rate as the input signal. The recursive filter outputs $X^*_{EST}$, $Y^*_{EST}$ will be recursively integrated until the output of subtractors 8 and 9 goes to zero. The $X_{out}$ and $Y_{out}$ signals will contain little or no coherent interfering signal.

The second tracking loop provides the signal which determines the phase shift of the phase shifter 14. The sensor for this tracking loop consists of multipliers 17 and 19 and subtractor 18. These elements perform a vector cross product function. The vector cross product function output $E_o$ is:

$$E_o = X^* Y^*_{EST} - Y^* X^*_{EST}.$$

The output is proportional to the sine of the angle between the input signal and the estimated signal. If the signals are not coherent, the output will be random noise which is then filtered by filter amplifier 20. If the outputs are coherent as in the examples above, then the output will represent the phase error between the input interfering signal phase and the estimated phase. A constant output will provide a constant output of the filter amplifier. The gain of the amplifier provides a large phase shift command to phase shifter 14 for a small phase error from the subtractor 18. The second tracking loop thus adjusts the phase shifter to track the interfering signal frequency.

Figure 2:
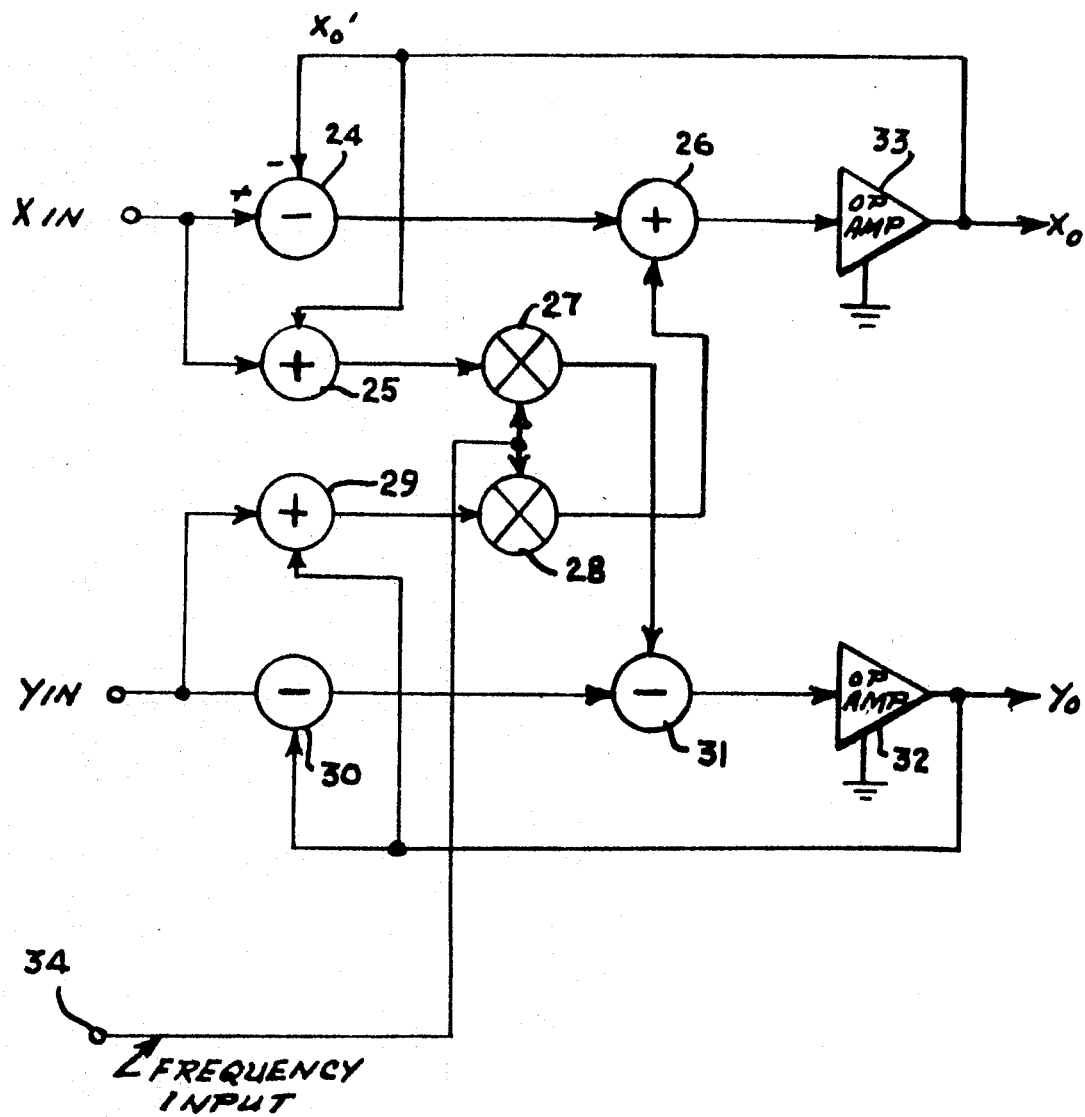
FIG. 2 is a block diagram of a phase shifter utilized in the interference filter of FIG. 1.

A functional diagram of phase shifter 14 is shown in FIG. 2. It comprises subtractors 24, 30, 31, summing means 25, 26, 29, multipliers 27, 28 and operational amplifiers 32, 33 connected as shown. This phase shifter circuit performs a rectantular coordinate transformation as described by equations (6), (7), and (8). The output amplitude $\sqrt{X^2_{OUT}+Y^2_{OUT}}$ is equal to the input amplitude $\sqrt{X_{in}^2+Y_{in}^2}$. The shifter uses multipliers, operational amplifiers, and feedback to servo the output to the desired value. That is, the phase shifter provides a phase shifted version of the estimated inputs, where the phase shift is proportional to the output of filter amplifier 20 shown in FIG. 1. The frequency input line 34 in FIG. 2, is the filter amplifier 20 output.

The frequency input signal from line 34 in FIG. 2 goes to multipliers 27 and 28. These multipliers provide a path for the input X to appear at the Y output, and the input Y to appear at the X output. If the frequency input is zero, then there is no cross feed through. In this case, the output $X_{in}$ passes through subtractors 24 and 26 to the operational amplifier 33. The output of the operational amplifier will slew to the input values $X_{in}$, so that the subtractor output 24 and adder output 26 is zero. The output $X_o$ is then equal to the input $X_{in}$. Similarly, $Y_o = Y_{in}$.

Now, if the frequency input is not zero, then the outputs $X_o$ and $Y_o$ will slew to a value which will zero the inputs into the operational amplifiers. The input to the X operation amplifier 33 is:

$$E_X = (X_{in} - X_o) + K(Y_{in} + Y_o)$$

and the input to the Y operational amplifier 26 is:

$$E_Y = (Y_{in} - Y_o) - K(X_{in} + X_o).$$

Where K is the voltage input.

The outputs will slew until the operational amplifier inputs $E_X$, $E_Y$ are zero. The output values are:

$$X_o = \cos(\theta) \cdot X_{in} - \sin(\theta) \cdot Y_{in}$$

$$Y_o = \sin(\theta) \cdot X_{in} + \cos(\theta) \cdot Y_{in}$$

where $$\theta = \tan^{-1} \frac{-2K}{1 - K^2}$$

Thus, the outputs are phase shifted versions of the input where the phase shift is directly proportional to K for small values of K.

While the invention has been described in terms of one presently preferred embodiment it is understood that the words which have been used are words of description rather than words of limitation and that changes within the purview of the amended claims may be made without departing from the scope of spirit of the invention in its broader aspects.

What is claimed is:

1. An adaptive interference tracker for suppression of narrow band interference comprising:
   a synchronous detector deriving in-phase and quadrature baseband signals from an RF input signal,
   signal sampling means sampling the output of said synchronous detector to provide in-phase and quadrature sample data baseband signals,
   means providing a bandwidth scaling constant,
   interference signal estimating means for generating from said in-phase and quadrature sample data baseband signals and said bandwidth scaling constant estimated in-phase and quadrature interference signals, said interference signal estimating means comprising data shifting integrator means,
   multiplier means receiving said in-phase and quadrature output signals and said bandwidth scaling constant and outputting its products to said phase shifting integrator means, an estimated interference signal feedback loop returning the output of said phase shifting integrator means to said phase shifting integrator means and to a subtractor means, and
   a phase shift tracking feedback loop between the output of said phase shifting integrator means and the output of said signal sampling means controlling the phase of said phase shifting integrator means to track interfering signal frequency, and
   said subtractor means for subtracting said estimated in-phase and quadrature interference signals from said sample data baseband signals to provide in-phase and quadrature output signals.

2. An adaptive interference tracker as defined in claim 1 wherein said phase shifting integrator means comprises:
   a phase shifter means,
   summing means summing the outputs of said multiplier means with said estimated interference signals and feeding said phase shifter means, and
   sample and hold circuit means fed from said phase shifter means and providing an output for said phase shifting integrator means.

3. An adaptive interference tracker as defined in claim 2 wherein said phase shift tracking feedback loop comprises:
   a first tracking loop multiplier multiplying in-phase sample data baseband signals by in-phase phase shifting integrator means output signals,
   a second tracking loop multiplier multiplying quadrature sample data baseband signals by quadrature phase shifting integrator means output signals,
   a tracking loop subtractor means for differencing the products of said first and second tracking loop multipliers, and
   a filter amplifier controlling the phase of said phase shift means in response to the output of said tracking loop subtractor means.

4. An adaptive interference tracker as defined in claim 3 wherein said signal sampling means comprises:
   sample and hold circuits operating at the input signal data rate.

5. An adaptive interference tracker as defined in claim 4 wherein said phase shifter means comprises:
   first, second and third subtractor means,
   first, second and third summing means,
   first and second multiplier means,
   first and second operational amplifiers,
   an in-phase signal input and output, and a quadrature signal input and output said subtractor means, summing means, multiplier means and operational of amplifiers each having first and second inputs and an output, said first subtractor means having its first input connected to in-phase signal input and the first input of said first summing means, its second input connected to the output of said first operational amplifier and its output connected to the input of said second summing means, said first operational amplifier having its first input connected to the output of said second summing means, its second input connected to ground and its output connected to the second input of said first summing means and to the in-phase signal output, said first multiplier means having its first input connected to the output of said first summing means, its second input connected to the output of said filter amplifier and its output connected to the first input of said third subtractor means, said second multiplier means having its first input connected to the output of said third summing means, its second input connected to the output of said filter amplifier and the second input of said first multiplier, and its output connected to the second input of said second summing means, said third summing means having its first input connected to the quadrature signal input and its second input connected to the output of said signal operational amplifier, said second subtractor means having its first input connected to the quadrature signal input, its second input connected to the output of said second operational amplifier and its output connected to the first input of said third subtractor means, said second operational amplifier having its first input connected to the output of said third subtractor means, its second input connected to ground and its output connected to the quadrature signal output.

* * * * *